US010591871B1

(12) United States Patent
Pellizzari et al.

(10) Patent No.: US 10,591,871 B1
(45) Date of Patent: Mar. 17, 2020

(54) METHOD OF SINGLE SHOT IMAGING FOR CORRECTING PHASE ERRORS

(71) Applicant: Government of the United States, as represented by the Secretary of the Air Force, Kirtland AFB, NM (US)

(72) Inventors: Casey J. Pellizzari, Prattville, AL (US); Mark F. Spencer, Albuquerque, NM (US); Charles A. Bouman, Jr., West Lafayette, IN (US)

(73) Assignee: THE GOVERNMENT OF THE UNITED STATES OF AMERICA AS REPRESENTED, BY THE SECRETARY OF THE AIR FORCE., Washington, DC (US)

( * ) Notice: Subject to any disclaimer, the term of this patent is extended or adjusted under 35 U.S.C. 154(b) by 0 days.

(21) Appl. No.: 16/565,335

(22) Filed: Sep. 9, 2019

Related U.S. Application Data

(62) Division of application No. 15/914,897, filed on Mar. 7, 2018, now Pat. No. 10,416,609.

(51) Int. Cl.
*G03H 1/04* (2006.01)
*G03H 1/32* (2006.01)
(Continued)

(52) U.S. Cl.
CPC ......... *G03H 1/0443* (2013.01); *G03H 1/0866* (2013.01); *G03H 1/2202* (2013.01);
(Continued)

(58) Field of Classification Search
CPC ...... G03H 1/0443; G03H 1/32; G03H 1/2202; G03H 1/0866; G03H 2001/0452;
(Continued)

(56) References Cited

U.S. PATENT DOCUMENTS

2012/0162733 A1* 6/2012 Ferraro ................ G03H 1/0866
359/9
2013/0100241 A1* 4/2013 Sato ....................... G02B 21/06
348/40
(Continued)

OTHER PUBLICATIONS

Ryoichi Horisaki, Single-shot and lensless complex-amplitude imaging with incoherent light based on machine learning, Jul. 31, 2018, Optical review, pp. 593-597 (Year: 2018).*
(Continued)

*Primary Examiner* — Michael P LaPage
(74) *Attorney, Agent, or Firm* — James M. Skorich

(57) ABSTRACT

Light reflected from an illuminated object is mixed with a reference beam and sensed at a sensor array of a digital hologram apparatus. Digital hologram data, determined from the sensed light, is dependent upon complex valued reflection coefficients of the object and upon phase perturbations in propagation paths between the object and the sensor array. Reflectance values, which may be dependent upon expected values of the absolute square of the reflection coefficients, and phase perturbations are determined for which a test function is at an extremum, where the test function contains a data fidelity term dependent upon the hologram data from a single hologram, a first regularization term dependent upon the phase perturbations and a second regularization term dependent upon the reflectance values. An image of the object may be formed from the reflectance values and a wavefront of the reflected light may be determined from the phase perturbations.

12 Claims, 7 Drawing Sheets

(51) Int. Cl.
*G03H 1/22* (2006.01)
*G03H 1/08* (2006.01)

(52) U.S. Cl.
CPC ....... *G03H 1/32* (2013.01); *G03H 2001/0452* (2013.01); *G03H 2001/2247* (2013.01)

(58) Field of Classification Search
CPC ....... G03H 2001/2247; G03H 2210/63; G03H 2001/0445; G03H 1/182; G03H 1/0486; G03H 2001/0491
See application file for complete search history.

(56) References Cited

U.S. PATENT DOCUMENTS

2016/0259297 A1* 9/2016 Sato .................. G03H 1/0443
2018/0074458 A1* 3/2018 Tsang ................. G03H 1/0841

OTHER PUBLICATIONS

Mark F. Spencer, Deep-turbulence wavefront sensing using digital-holographic detection in the off-axis image plane recording geometry, Oct. 31, 2016, SPIE, pp. 1-13 (Year: 2016).*

* cited by examiner

METHOD OF SINGLE SHOT IMAGING FOR CORRECTING PHASE ERRORS

CROSS-REFERENCE TO RELATED APPLICATION

This application is a divisional application of U.S. patent application Ser. No. 15/914897 filed on Mar. 7, 2018, which issued as U.S. Pat. No. 10,416,609, and claims the benefit of the foregoing filing date.

STATEMENT OF GOVERNMENT INTEREST

The invention described herein may be manufactured, used, and licensed by or for the Government of the United States for all governmental purposes without the payment of any royalty.

BACKGROUND

Techniques have been proposed for estimating and correcting phase errors from digital holography (DH) data using image sharpening algorithms. Such algorithms are designed for cases where multiple independent data sets are available, and the techniques are known as multi-shot DH. For cases where only a single data set is available, known as single-shot DH, image sharpening algorithms perform poorly, especially in the presence of strong turbulence.

Digital Holography (DH) uses coherent illumination and heterodyne detection to sense the amplitude and phase of light scattered off an object's surface. The resulting data is sensitive to phase errors caused by index-of-refraction perturbations in the atmosphere, other propagating medium, or optical systems. These errors can be estimated directly from the DH data for the purposes of forming focused images or for wave-front sensing. Image sharpening (IS) techniques estimate phase errors from DH data by maximizing an image sharpness metric. The images are formed from estimates of the complex-valued reflection coefficient, g, given by the complex-valued ratio of the reflected field to the incident field. For surfaces which are rough relative to the illumination wavelength, this leads to images with short scale (high-spatial frequency) spatial variations known as speckle. Image sharpening algorithms require incoherent averaging of multiple speckle realizations, referred to as multi-shot DH, to accurately estimate phase errors. As such they are not applicable when only a single data realization (single shot) is available. This may be the case, for example, when an object to be imaged is in motion.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

DETAILED DESCRIPTION

Figure 1:
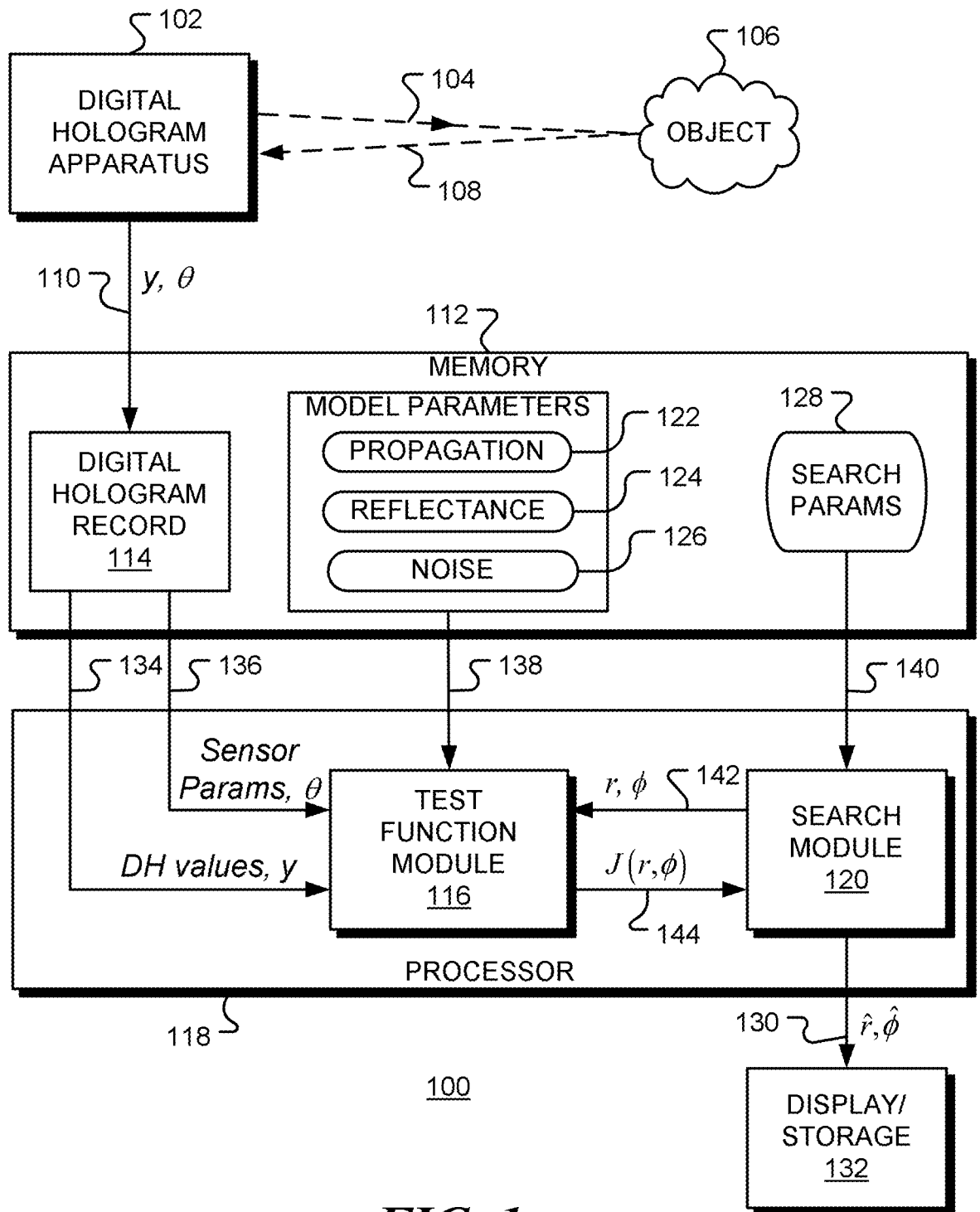
FIG. 1 is a block diagram of a digital hologram receiver, in accordance with a representative embodiment.

The various methods, systems, apparatus, and devices described herein generally relate to imaging and wavefront sensing using single shot digital holography and, in one embodiment, to the production of images with reduced high spatial frequency variations known as 'speckle'.

While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

In accordance with various embodiments of the disclosure, a method and apparatus are provided for sensing light reflected from an illuminated object to form an image an of the object or determine other optical properties of the object.

FIG. 1 is a block diagram of a digital hologram receiver 100, in accordance with embodiments of the disclosure. The receiver 100 includes digital hologram apparatus 102 that emits an object beam 104 that illuminates an object or scene 106 and receives light 108 reflected from the object or scene 106. Object beam 104 may be a monochromatic laser beam, for example.

In one embodiment, the digital hologram apparatus 102 is configured to split a monochromatic laser beam into an object beam (104) and a reference beam. The object beam 104 is used to illuminate an object 106. Light 108 reflected from the illuminated object 106 is coherently combined with the reference beam to produce an interference pattern that is sensed by a sensor array of the digital hologram apparatus 102. Hologram data y (110) is determined from the sensed interference pattern and is stored in memory 112 as digital hologram record 114.

In accordance with an aspect of the present disclosure, characteristics of the object 106 may be determined from a single digital hologram record 114.

In accordance with a further aspect of the present invention, characteristics of turbulence may be determined from a single digital hologram record 114.

Optionally, a distance d of the object from the sensor array is estimated by digital hologram apparatus 102 and included in record 114. However, in some applications the distance d may be known or determined by other means.

The reflected light 108 is sensed by a sensor array of digital hologram apparatus 102. The sensor array has an array of sensing elements which sense the light to provide an array of pixel values. The reflective properties of the illuminated object are characterized by complex valued reflection coefficients. Here, the complex reflection coefficient of a region i of the object is denoted by $g_i$. A corresponding vector of complex valued reflection coefficients is denoted as g.

Surface Roughness and Speckle

The surface roughness of an object often has a scale larger than the wavelengths of a monochromatic light that illuminates it. As a result, the phase of the reflection coefficient varies randomly over an ensemble of objects. The phase of a monochromatic beam reflected from a particular object will have a wide spatial variation, resulting in a phenomenon known as speckle.

Many prior techniques seek to estimate the reflection coefficients g and, as such, are subject to speckle. One approach used to reduce speckle is to combine results from multiple hologram records in an attempt to 'average out' the speckle. In contrast, the techniques of the present disclosure enable an image with little or no speckle to be formed from a single hologram record.

Phase Perturbations

Light reflected from the illuminated object 106 to a sensor array of digital hologram apparatus 102 is subject to phase perturbations. These phase perturbations may be caused by turbulence in the propagation medium, for example. These phase perturbations cause degradation of an image formed from the hologram record. In accordance with an aspect of the disclosure, the phase perturbations are estimated and then compensated for.

In certain embodiments of the present disclosure, the propagation medium is modelled as a number of discrete regions distributed along the propagation paths between the illuminated object and the sensor array. Each region is modelled as causing a phase perturbation. The phase perturbation caused by the $k^{th}$ region is denoted as $\phi_k$ in light reflected from the illuminated object. The complete set of phase perturbations in all regions is denoted as $\phi$. A feature of the present disclosure is that the regions are distributed over a volume of the medium between the object and a sensor array. For example, multiple parallel phase planes may be distributed through the volume. Each phase plane is divided into a number of regions. In general, the regions may have various shapes and sizes.

In a further embodiment, phase perturbations are modeled for both the outgoing object beam and the reflected beam.

Previous approaches commonly estimate phase perturbations in a single phase plane. This approach is useful when phase perturbations occur only in a thin region. However, when phase perturbations are present along a significant part of the propagation region or all of the propagation region, a single phase plane is not sufficient to model the phase perturbations.

Digital Hologram Data

In accordance with an embodiment of the disclosure, hologram data, denoted as a vector of values y (110), is recorded at the sensor array. The hologram data values y are dependent upon the complex valued reflection coefficients g of the illuminated object 106 and further dependent upon the propagation paths between the illuminated object and the sensor array. In addition, the hologram data values are dependent upon sensor parameters such as the Field of View (FOV) and the pixel width/pitch. The pixel locations in the sensor array correspond to locations on the illuminated object.

The digital hologram data may be modelled as $$y = A(\phi, \theta) g + w \quad (1)$$

where $A(\phi,\theta)$ is a transfer function that depends upon the phase perturbations $\phi$ along the propagation paths, $\theta$ is a vector of sensor properties, and w is an additive noise vector. The sensor properties in vector $\theta$ include the distance d of the sensor array from the illuminated object, the field of view (FOV) and the pixel width/pitch. In equation (1) the reference beam is assumed to be uniform and the terms have been scaled to remove the dependence on the reference beam.

The transfer function $A(\phi,\theta)$ describes the propagation of light from the object to the sensor array. Included in the transfer function is a propagation term that may be modeled using a Split-step Beam Propagation Method (SBPM), for example, that provides a framework for modeling a single longer propagation as a number of shorter propagations through multiple phase screens distributed over the propagation path. Also included in the transfer function $A(\phi,\theta)$ is the response of the sensor array and associated optics. In one embodiment, the transfer function $A(\phi,\theta)$ is computed over K phase screens as $$A = D(a)\Lambda_K \left[ \prod_{k=1}^{K} D(e^{i\phi_k}) F^{-1} H_k F \right] \Lambda_0,$$

where $D(.)$ is an operator that produces a diagonal matrix from a vector, a is the binary aperture transmission function, $\phi_k$ is the phase perturbation function of the $k^{th}$ phase screen, F is two-dimensional discrete spatial Fourier transform matrix, with $F^{-1}$ as its inverse, $H_k$ is a free-space transfer function for the $k^{th}$ propagation. The diagonal matrices $\Lambda_0$ and $\Lambda_k$ account for any scaling differences between the object-plane grid length and the observation-plane grid length. Further details of an example embodiment are provided in the attached Appendix titled 'Imaging through Deep Turbulence with Single-Shot Digital Holography using the DEAP Algorithm'.

Prior techniques have sought to use equation (1) to estimate the complex reflection coefficients g and phase perturbations $\phi$. This approach has met with limited success because of the surface roughness effects on the phase of the complex reflection coefficient vector g.

Associated with the reflection coefficients is a reflectance vector r, where the $i^{th}$ component value, $r_i$, of the reflectance vector r corresponds to an ensemble average of the corresponding absolute squared reflection coefficient. That is, $r_i = \langle |g_i|^2 \rangle$, where the angled brackets denote an ensemble average. In accordance with the present disclosure, the real valued reflectance vector r is estimated rather than the complex reflection coefficient vector g. The ensemble average of $|g_i|^2$ is not subject to variations (such as speckle), since the surface roughness is averaged out in the ensemble.

In accordance with an aspect of the present disclosure, a relationship between the measured digital hologram values y, the vector r of reflectance values and the phase perturbations $\phi$ is used to estimate reflectance values r and phase perturbation $\phi$ from a measured vector y.

In order to estimate reflectance values r and phase perturbation $\phi$, a test function module 116 is provided in processor 118 to compute values of a test function that is a function of estimated reflectance values r and estimated phase perturbations $\phi$. The test function is searched, using search module 120, to find reflectance values r and phase perturbation $\phi$ for which the test function is at an extremum. These values are denoted as $\hat{r}$ and $\hat{\phi}$.

The test function contains a data fidelity term that indicates how well values of y estimated from reflectance values r and phase perturbations $\phi$ match the sensed values. The test function also includes a first regularization term indicative of anticipated spatial variations in the phase perturbations $\phi$ and a second regularization term indicative of anticipated spatial variations in the reflectance values r. For example, the first regularization terms may relate to short-scale spatial correlations, or structural similarity of the turbulence. The second regularization terms may relate to short-scale spatial correlations or to structural similarity across the image.

The first regularization function is characterized by first model parameters 122, while the second regularization function is characterized by second model parameters 124. The first and second model parameters may be stored in memory 112 and retrieved as needed for computation of the regularization functions. Optionally, third model parameters 126 may be used to model the additive noise w in equation (1).

Operation of search module 120 is dependent upon search parameters 128 stored in memory 112. The search parameters may include initial and stopping conditions, iteration counts, search orders, etc.

Once a search is complete, characteristics of the illuminated object may be determined from the reflectance values $\hat{r}$ and phase perturbation $\hat{\phi}$ 130 that produced the extremum in the test function. For example, an image may be formed from the reflectance values r. The image may be displayed or stored by device 132.

For example, the data fidelity term may be an error term and the first and second data regularization terms may be penalty terms. In this example, the test function is searched to find a minimum.

Alternatively, the data fidelity term may be a goodness-of-fit term and the first and second data regularization terms may be likelihood or probability terms. In this example, the test function is searched to find a maximum.

In operation, test function module 116 retrieves the digital hologram data y (134) and, optionally, sensor parameters $\theta$ (136) from the memory 112 or directly from the digital hologram apparatus 102. The sensor parameters may include the propagation distance, d. Test function module 116 also retrieves the model parameters 138 from memory 112. The search module retrieves the search parameters 140 from memory 112.

During the search process, the search module provides test reflectance values r and test phase perturbations $\phi$ (142) to the test function module 116. From these values, the test function module 116 computes a value $J(y;r,\phi)$ (144) of the test function. Depending on the choice of test function, the test function is searched to find reflectance values r and phase perturbations 0 that either maximize or minimize the test function.

Data Fidelity

Using equation (1), the covariance matrix for the hologram data is $$\Sigma = \langle yy^H \rangle = A(\phi,\theta)\langle gg^H \rangle A(\phi,\theta)^H + \sigma^2 I \qquad (2)$$
$$= A(\phi,\theta)D(r)A(\phi,\theta)^H + \sigma^2 I,$$

in which the superposed "H" denotes the Hermitian transpose, $\sigma^2$ is the variance of the additive noise w, I is the identity matrix and the angled brackets denote an ensemble average over objects. D(r) denotes an operator that creates a diagonal matrix from a vector. Thus, the elements of D(r) are $$[D(r)]_{ij} = \langle |g_i|^2 \rangle \delta_{ij}, \qquad (3)$$

where $\delta_{ij}$ is the Kronecker delta and, again, the angled brackets denote an ensemble average.

Equation (2) provides a relationship between the digital hologram data y and the reflectance r that does not required knowledge of the complex reflection coefficient. This may be used to define a variety of data fidelity functions.

In one embodiment, the data fidelity function is taken as $$Y(y;r,\phi) = p(y|r,\phi), \qquad (4)$$

where $p(y|r,\phi)$ is the conditional probability density function for the hologram data vector y.

In a further embodiment, the data fidelity function is taken as $$Y(y;r,\phi) = \log\{p(y|r,\phi)\}. \qquad (5)$$

For example, for a hologram data vector y of length M, the conditional probability density function for a hologram data vector may be described by a zero-mean complex normal distribution $$p(y|r,\phi) = \frac{1}{\pi^M \|\Sigma\|} \exp\left(-y^H \Sigma^{-1} y\right), \qquad (6)$$

where the covariance matrix $\Sigma$ is given by equation (2).

Other data fidelity functions, such as a log likelihood function with a Poisson distribution, may be used without departing from the present disclosure. Approximations to the data fidelity functions in equations (4) and (5) may be used. For example, a surrogate function may be used that provides a bound on the data fidelity function, but has a simpler form.

An advantage of using a log likelihood distribution for the measured data as the data fidelity term is that it incorporates the physics of the system. However, other data fidelity terms may be used such as an L1 or L2 norm, which measure the difference between an estimate of the data and the measured data.

The test function contains the data fidelity term $Y(y;r,\phi)$, dependent upon the data values y from a single hologram, a first regularization term $R_\phi(\phi,p_1)$ dependent upon the first parameters $p_1$ and the phase perturbation $\phi$, and a second regularization term $R_r(r,p_2)$ dependent upon the second parameters $p_2$ and the reflectance values r. The test function is given by:

$$J(y;r,\phi) = Y(y;r,\phi) + R_\phi(\phi,p_1) + R_r(r,p_2). \qquad (7)$$

The regularization terms in equation (7) are indicators of how well r and $\phi$ match preconceived or prior knowledge of their characteristics. For example, in one embodiment, the test function is taken as $$J(y;r,\phi) = -\log\{p(r,\phi|y)p(y)\} = -\log\{p(y|r,\phi)\} - \log\{p(r)\} - \log\{p(\phi)\}, \qquad (8)$$

which is to be minimized. The following data fidelity and regularization terms result:

$$Y(y;r,\phi) = -\log\{p(y|r,\phi)\},$$
$$R_\phi(\phi,p_1) = -\log\{p(\phi)\}, \qquad (9)$$
$$R_r(r,p_2) = -\log\{p(r)\}.$$

Regularization of Phase Perturbations

In one embodiment of the disclosure, the test function includes a first regularization function that takes the form $$R_\phi = \sum_{k=1}^{K-1} R_{\phi,k} \qquad (10)$$
$$R_{\phi,k} = \sum_{[i,j]\in P} b_{ij}^k |\phi_{k,j} - \phi_{k,i}|^2,$$

where K is the number of phase screens, $b_{ij}^k$ are first model parameters, and P denotes all pairs in a phase screen. The set of first model parameters is denoted as $p_1 = \{b_{ij}^k\}$. This form measures differences between phase perturbations in the same phase plane. Optionally, differences between phase perturbations in adjacent phase planes may be considered in addition.

Regularization of Reflectance Values

In one embodiment of the disclosure, the test function includes a second regularization function that takes the form $$R_r = \sum_{[i,j]\in P} c_{ij}|r_j - r_i|^2, \qquad (11)$$

where $c_{ij}$ are second model parameters, and P denotes all pairs of elements in the array. The set of second model parameters is denoted as $p_2 = \{c_{ij}\}$.

In a further embodiment of the disclosure, the second regularization functions take the form $$R_r = \sum_{[i,j]\in P} c_{ij} \Delta_{ij}^p \left( \frac{\Delta_{ij}^{q-p}}{T^{q-p} + \Delta_{ij}^{q-p}} \right), \qquad (12)$$

where $$\Delta_{ij} = \frac{|r_j - r_i|}{\sigma_r}$$

and where $c_{ij}$, p, q, $\sigma_r$ and T are second model parameters. The parameter T controls the transition from exponent p to exponent q. The parameter $\sigma_r$ controls the variation in the reflectance r. For this embodiment, the set second model parameters are denoted as $p_2 = \{c_{ij}, p, q, \sigma_r, T\}$.

These example regularization functions depend upon differences between neighboring reflectance or phase perturbation values. For positive values of the parameters $b_{ij}$ and $c_{ij}$, the functions increase with increasing variation between neighboring values.

The regularization terms discussed above use a model that encourages spatial correlation between neighboring elements. Other options include:
(1) A function which enforces sparsity in some domain, such as the coefficients of some set of bases functions.
(2) A function that penalizes large gradients between neighboring elements.
(3) A function that enforces self-similarity within the structure of an image. Self-similarity occurs, for example, when an image has features that repeat and can be used as building blocks to build an estimate.
(4) A Gaussian de-noising algorithm. This can be used as a regularization term, even for non-Gaussian problems. De-noising algorithms have an inherent prior model, which may not be known explicitly but which can regularize the estimate.

Derivation and use of an example test function, together with some example results, are provided in the attached Appendix titled 'Imaging through Deep Turbulence with Single-Shot Digital Holography using the DEAP Algorithm'.

Figure 2:
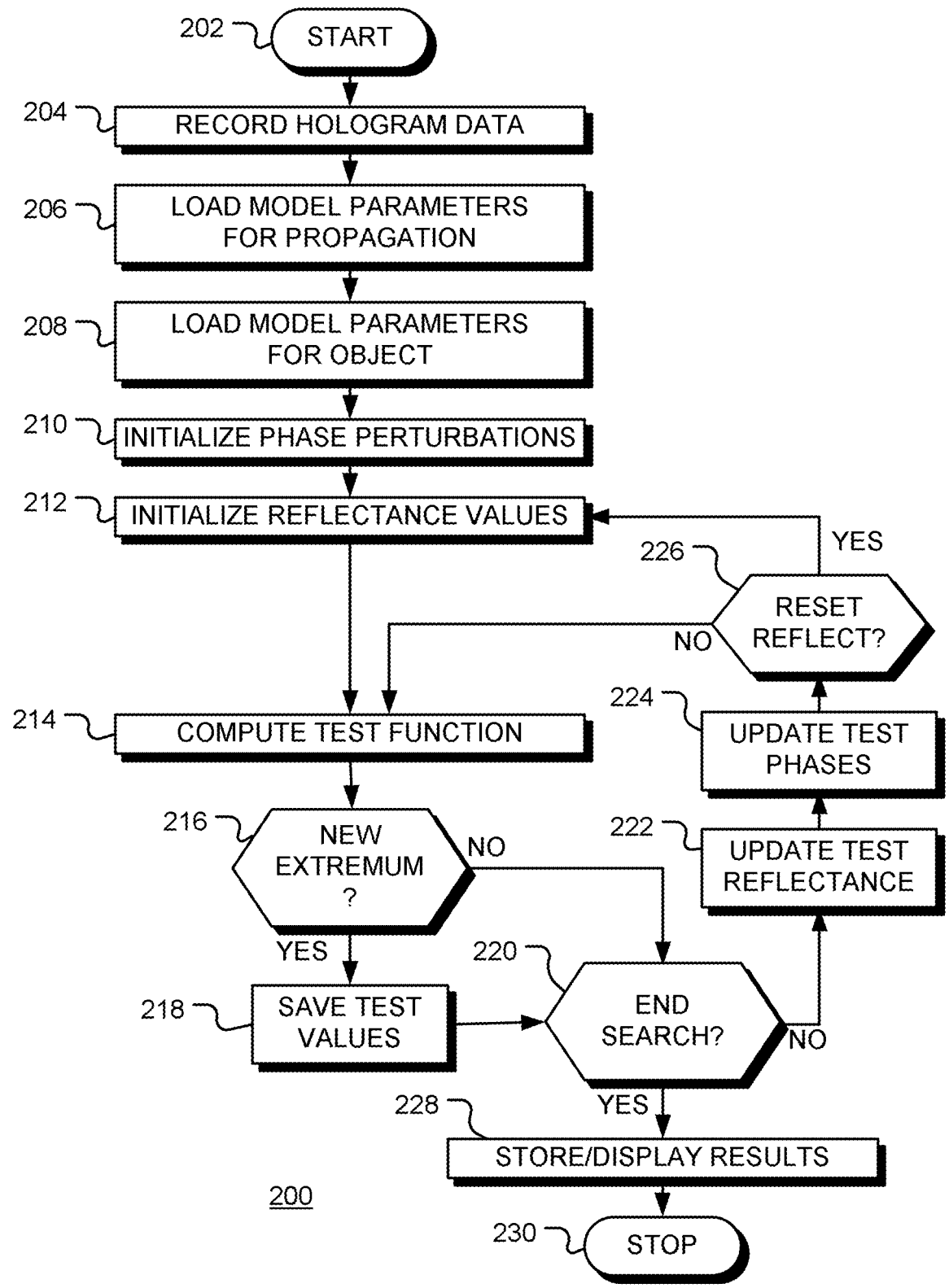
FIG. 2 is a flow chart of a method for constructing an image, in accordance with a representative embodiment.

FIG. 2 is a flow chart of a method 200 in accordance with embodiments of the disclosure. Following start block 202, a digital hologram is recorded at block 204 to provide digital hologram data. At block 206, first model parameters, relating to regularization of phase perturbations, are loaded from memory. At block 208, second model parameters, relating to the reflectance of an object, are loaded from memory. At block 210, phase perturbation values are initialized (to zero for example). At block 212, reflectance values are initialized. In one embodiment, the elements of the reflectance vector r are initialized as $$r_i = |[A^H(\phi, \theta) y]_i|^2. \tag{13}$$

At block 214, the test function module computes the value of the test function for the selected phase perturbation values and reflectance values. At decision block 216, the search module determines of the computed value of the test is a new extremum. If so, as depicted by the positive branch from decision block 216, the current phase perturbation and reflectance values are saved at block 218. Flow continues to decision block 220. If it is determined that the search is not ended, as depicted by the negative branch from decision block 220, one or more reflectance values are updated at block 222 and one or more of the test phase perturbation values is updated at block 224. Periodically, as depicted by the positive branch from decision block 226, the reflectance values are re-initialized at block 212. Otherwise, as depicted by the negative branch from decision block 226, flow continues again to block 214, where the test function is re-evaluated and the search for extrema continues. If it is determined that the search should end, as depicted by the positive branch from decision block 220, the saved results are stored and/or displayed at block 228. For example, the reflectance values may be used to generate an image of the illuminated object, or the phase perturbation values used to characterize the wavefront of the turbulence at the sensor or in the propagation path. The process terminates at block 230.

The search may end after a set number of iterations, or when some stop condition is met. In one embodiment, a metric $$\varepsilon = \frac{\|r^i - r^{i-1}\|}{\|r^{i-1}\|} \tag{14}$$

is used, where i denotes an iteration number. This metric measures the relative change in the reflectance vector from one iteration to the next. The search is ended when the metric $\epsilon$ fall below a threshold value $\varepsilon_T$.

Figure 3:
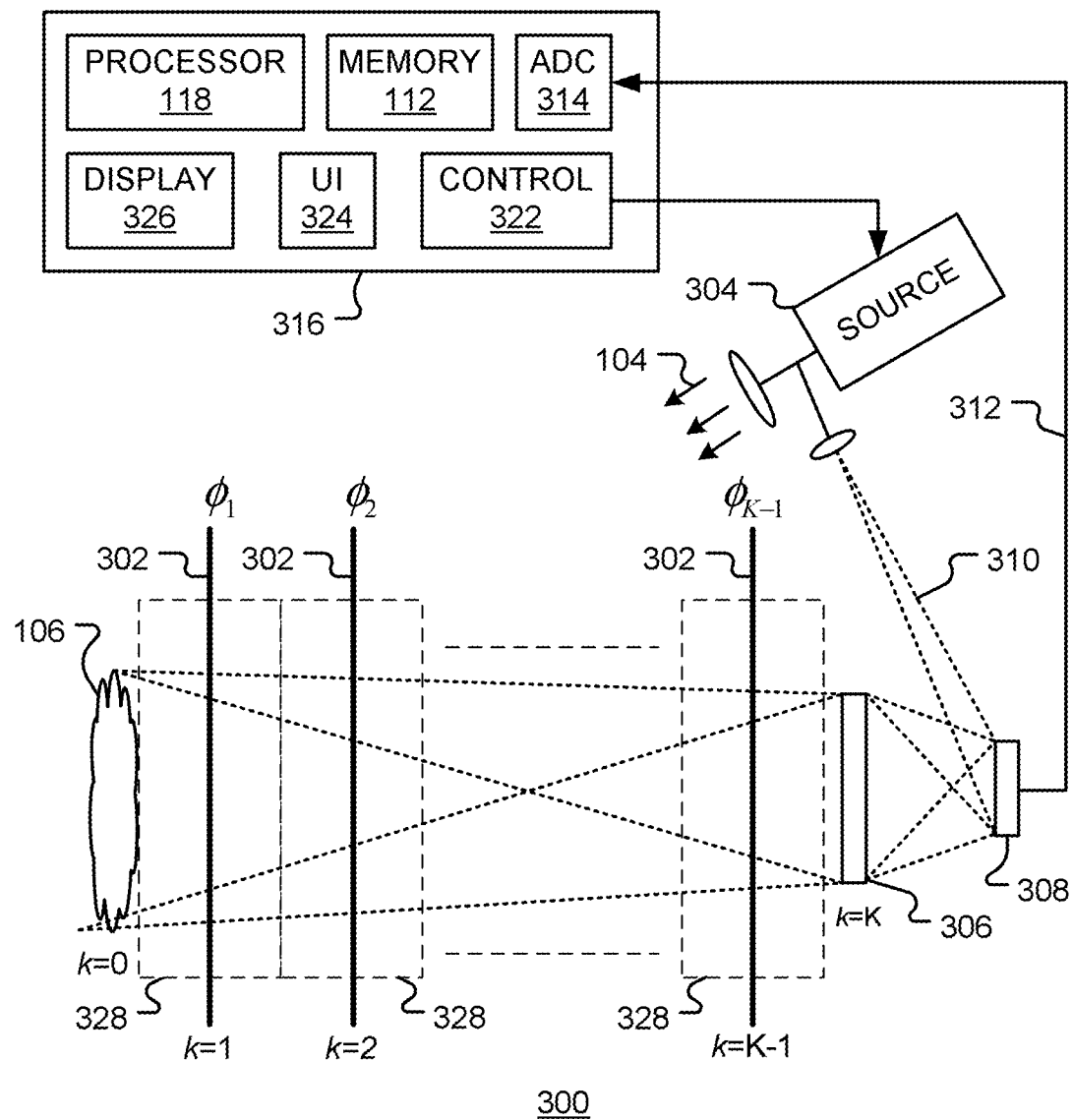
FIG. 3 is a block diagram of a digital hologram system, in accordance with a representative embodiment.

FIG. 3 is a block diagram of a digital hologram system 300, in accordance with a representative embodiment. A monochromatic beam 104, termed an object beam, is emitted from source 304 and illuminates object 106. Light reflected from object 106 propagates through aperture 306 to sensor array 308. A reference beam 310 interferes with the reflected beam to form an interference pattern that is sensed by sensor array. This process is known as optical heterodyne detection. The sensor array may be located in the focal plane of a lens, for example, that focuses the light reflected from the illuminated object. Signals 312 from sensor array 308 are digitized in analog-to-digital converter (ADC) 314. The hologram data is derived from the digitized signals. For example, a combination of a spatial Fourier transform and spatial filtering may be used to isolate the hologram data of interest. ADC 314 may be located in processing system 316 or integrated with the sensor array 308, for example. In this embodiment shown, processing system 316 includes a memory 112 for storing first and second model parameters. The digitized data and/or the hologram data derived therefrom may also be stored in memory 112. Processor 118 is configured to access the memory 112 and to process hologram data. Processing system 316 may also include control unit 322 that synchronizes control source 304 and ADC 314 to acquire the digitized data. Processing system 316 may also include a user interface 324 and display 326 for displaying images of the object 306 derived from the hologram data. The elements of processing system 316 may be integrated in a single system or arranged as a distributed system. One or more elements may be located at location remote from the sensor array.

Light reflected from object 106 propagates through a number of contiguous volumetric regions 328 and aperture to reach sensor array 308. As the light passes through each region, it may be subject to a phase perturbation. The phase perturbation may be caused by turbulence in the propagating medium (which may be air or water, for example). In accordance with an aspect of the present disclosure, the phase perturbations are modeled as (K-1) planar phase screens 302 distributed throughout the propagation region. In turn, each phase screen is divided into a number of sub-regions. The phase perturbation in sub-region j of phase screen k is denoted as $\phi_{k,j}$. The number and/or shape of the sub-regions may vary between phase screens.

Figure 4:
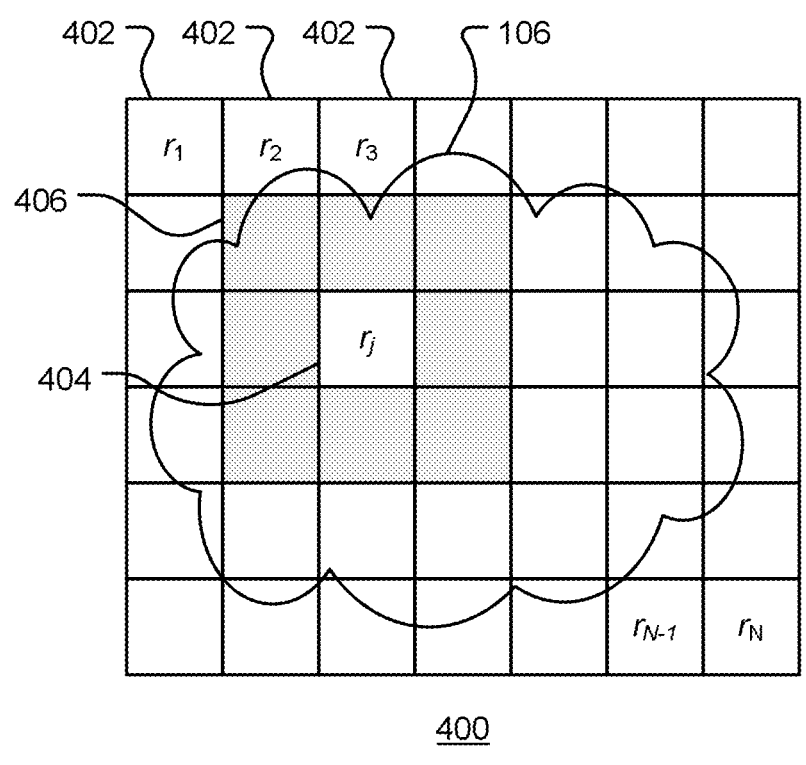
FIG. 4 is a diagrammatic representation of an array of pixels of an image, in accordance with a representative embodiment.

FIG. 4 is a diagrammatic representation of an array of pixels of an image, illustrating object reflectance values, in accordance with embodiments of the disclosure. Pixel array 400 comprises a number of pixels 402, each corresponding to one or more sensing elements of a sensor array. An image 404 of an illuminated object is located in some or all of the pixel regions 402. An illuminated region of the object appears in a corresponding pixel of the image. For example, region 406 refers to a region of image 404 and a corresponding region of the illuminated object.

Associated with each region of the illuminated object is a reflectance value. For example, region 406 of the image 404 is associated with a region of the object with a reflectance value As discussed above, a reflectance value is derived from an ensemble average of the corresponding absolute squared reflection coefficient. In the example shown, regions elements 406, shown in gray surrounding image 404, constitute neighboring regions. The absolute values of the differences between reflectance values in the neighboring regions and the reflectance value $r_j$. contribute to the regularization value $R_r$, discussed above.

Figure 5A:
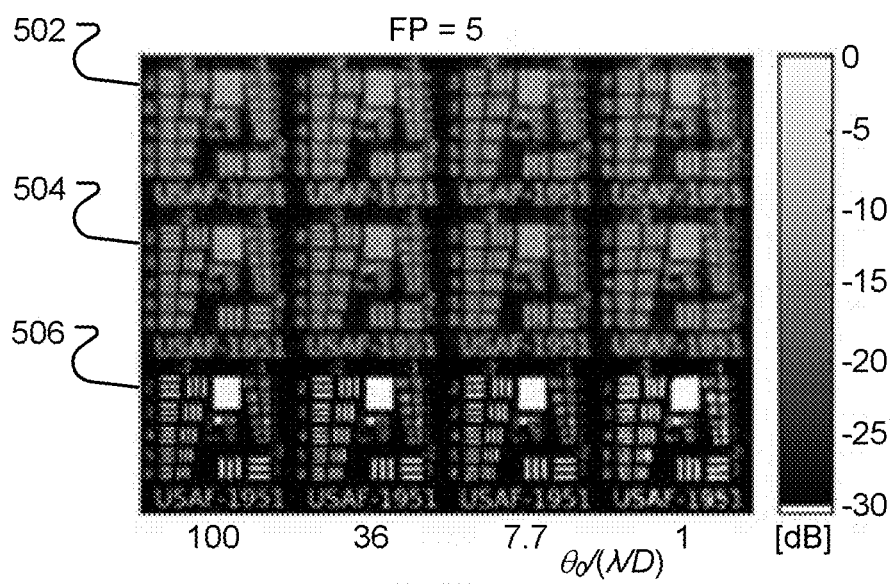
FIGS. 5A-5C show example images produced by a digital hologram receiver, in accordance with a representative embodiment.
Figure 5B:
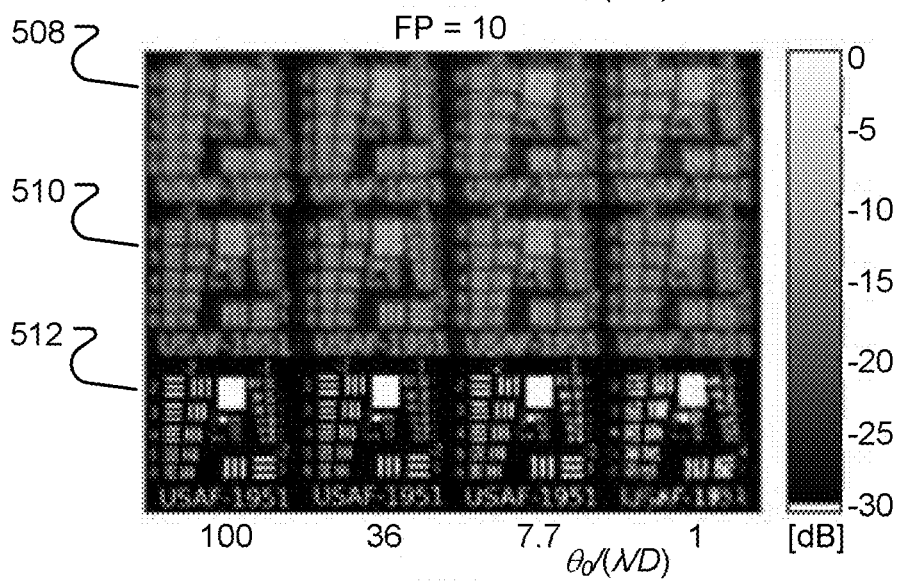
Figure 5C:
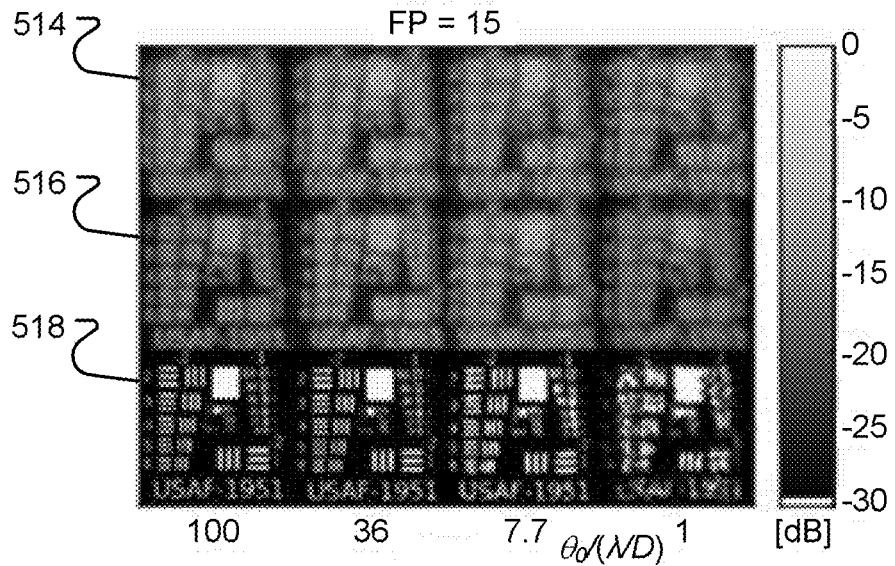

FIGS. 5A-5C show example images produced by a digital hologram receiver, in accordance with a representative embodiment. Digital hologram data was simulated for an object with a known reflectance located 80m from the sensor array. A single realization of the reflection coefficients g was generated assuming a complex normal distribution and phase perturbations due to turbulence were simulated using a Kolmogorov model for the refractive index power spectral density. The turbulence strength was determined by the Fried Parameter (FP) which is the ratio of the receiver aperture size D to the atmospheric correlation length for a spherical wave reflected light. FIG. 5A-5C show results for Fried Parameters FP=5, 10, 15, respectively. Higher values of FP correspond to stronger turbulence. The results are plotted for various values of the quantity $\theta_0/(\lambda/D)$, which is the ratio of the isoplanatic angle $\theta_0$ to the diffraction limited viewing angle, $\lambda/D$. Here, $\lambda$ is the wavelength of the monochromatic light. The isoplanatic angle $\theta_0$ is the image-plane angle over which the phase errors encountered by neighboring points becomes decorrelated. Specifically, $\theta_0$ is the angle at which the phase structure function falls below 1 rad$^2$, where the phase structure function indicates the variance of the difference in phase as a function of separation in the pupil. Therefore, the ratio $\theta_0/(\lambda/D)$ indicates how different the phase errors are across the image, relative to the diffraction limited spot size. High values of $\theta_0/(\lambda/D)$ indicate a high correlation between the phase structure functions of neighboring points and low values correspond to a low correlation.

In FIG. 5A, the images in row 502 show the original uncompensated image for four values of $\theta_0/(\lambda/D)$. The images in row 504 are compensated using a Multiplane Image Sharpening (MIS) compensation technique of the prior art. The images in row 506 are formed using reflectance values determined using an implementation of the technique disclosed above. In FIG. 5A, the Fried parameter (FP) has the value 5. FIGS. 5B and 5C show corresponding results for Fried Parameters of 10 and 15, respectively. In FIG. 5B, the images in row 508 show the original uncompensated image for four values of $\theta_0/(\lambda/D)$. The images in row 510 are compensated using a Multiplane Image Sharpening (MIS) compensation technique of the prior art. The images in row 512 are formed using reflectance values determined using an implementation of the technique disclosed above. In FIG. 5C, the images in row 514 show the original uncompensated image for four values of $\theta_0/(\lambda/D)$. The images in row 516 are compensated using a Multiplane Image Sharpening (MIS) compensation technique of the prior art. The images in row 518 are formed using reflectance values determined using an implementation of the technique disclosed above. FIGS. 5A-5C illustrate an improved image quality compared to the uncompensated image and compared to the prior technique. In particular, the images are substantially free from 'speckle'.

FIGS. 6A-6C and 7A-7C show example performance results for a digital hologram receiver, in accordance with a representative embodiment.

Figure 6A:
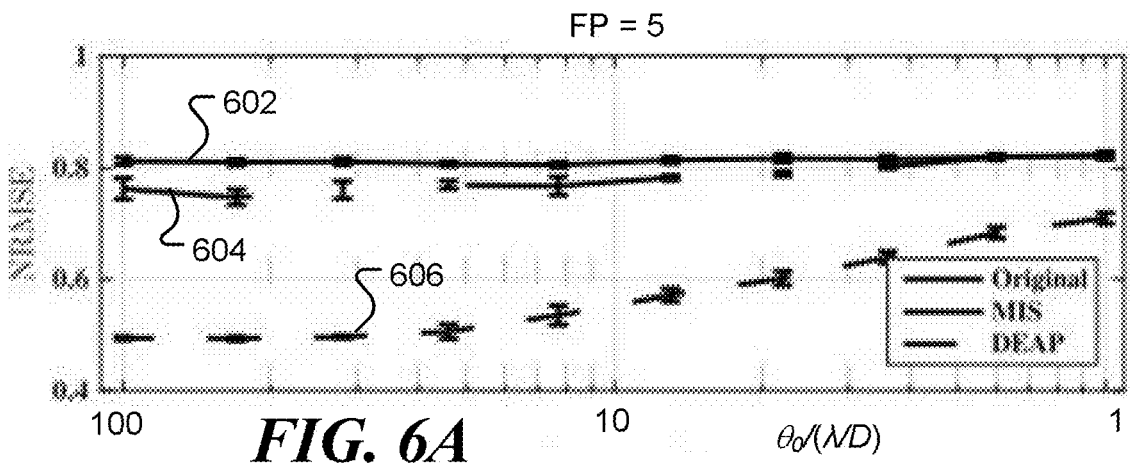
FIGS. 6A-6C and 7A-7C show example performance results for a digital hologram receiver, in accordance with a representative embodiment.
Figure 6B:
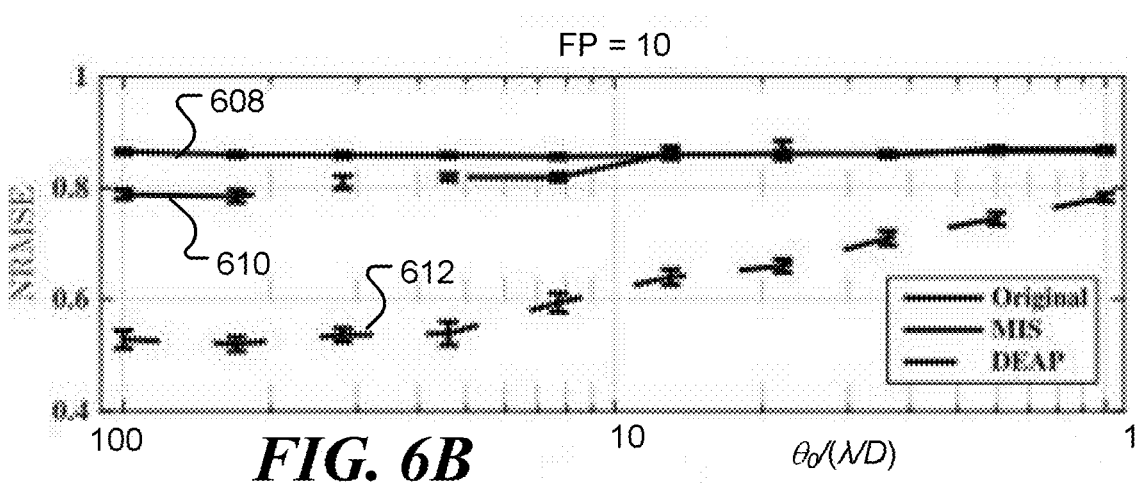
Figure 6C:
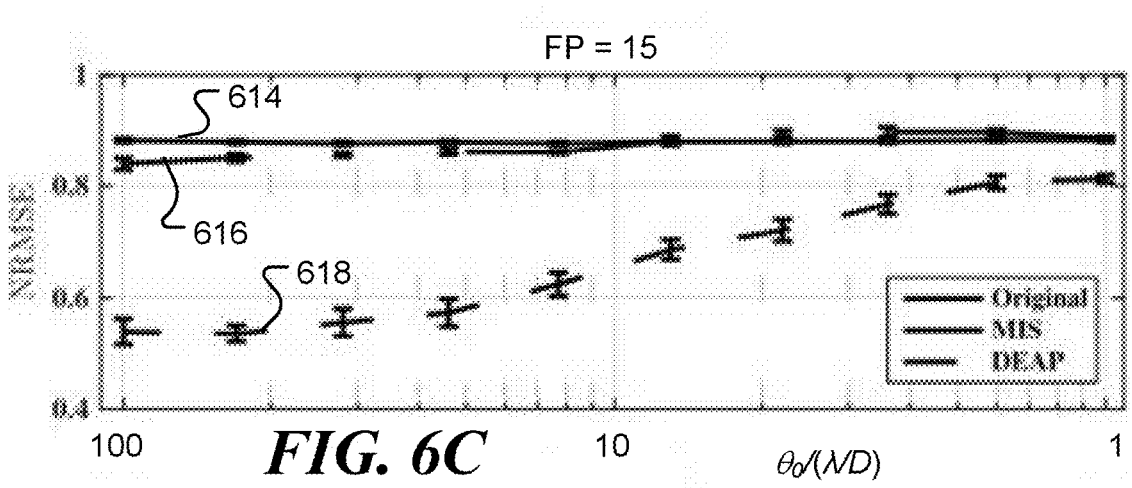

FIGS. 6A-6C shows graphs of the normalized root mean square error (NRMSE) in an image formed from the reconstructed reflectance values as a function of $\theta_0/(\lambda/D)$ for Fried Parameters FP=5, 10, 15, respectively. The NRMSE is a measure of the distortion between reconstructed images and is defined here as $$NRMSE = \operatorname*{argmin}_{\alpha} \frac{\|\alpha \hat{r} - r\|}{\|r\|} \quad (15)$$

where $\alpha$ is a multiplicative scale factor.

FIG. 6A shows that, for FP=5, the NRMSE 602 of the uncompensated image is greater than the NRMSE 604 for an image estimated by an MIS receiver. The NRMSE 606 for an image formed by the disclosed digital hologram receiver is the lowest. The disclosed digital hologram receiver is denoted in the figure as the 'Deep-turbulence Estimator for Anisoplantic Propagations' (DEAP).

FIG. 6B shows corresponding results for FP=10. Again, the NRMSE 608 of the uncompensated image is greater than the NRMSE 610 for an image estimated by the MIS receiver. The NRMSE 612 for an image formed by the disclosed digital hologram receiver is the lowest.

FIG. 6C shows corresponding results for FP=16. Again, the NRMSE 614 of the uncompensated image is greater than the NRMSE 616 for an image estimated by the MIS receiver. The NRMSE 618 for an image formed by the disclosed digital hologram receiver is the lowest.

Figure 7A:
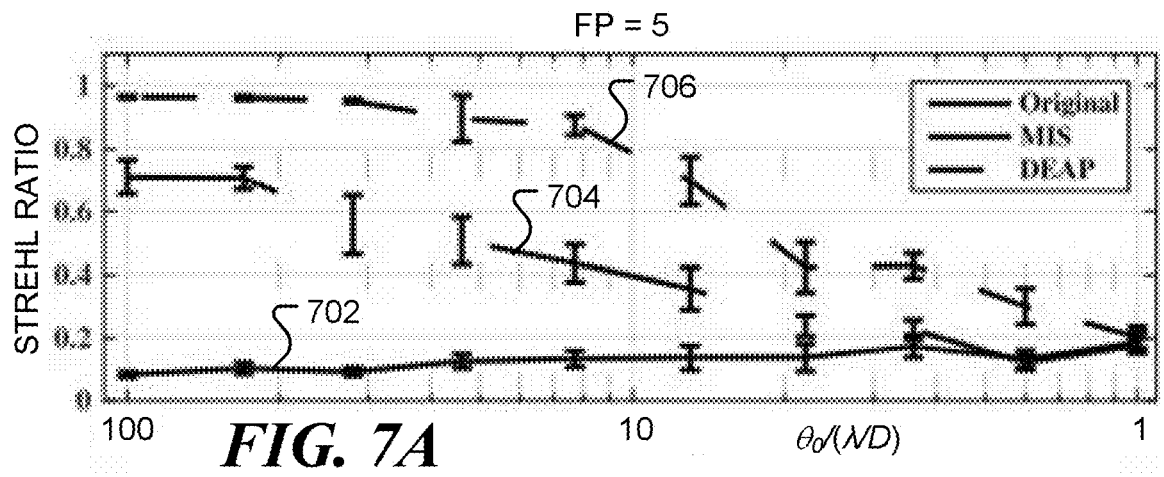
Figure 7B:
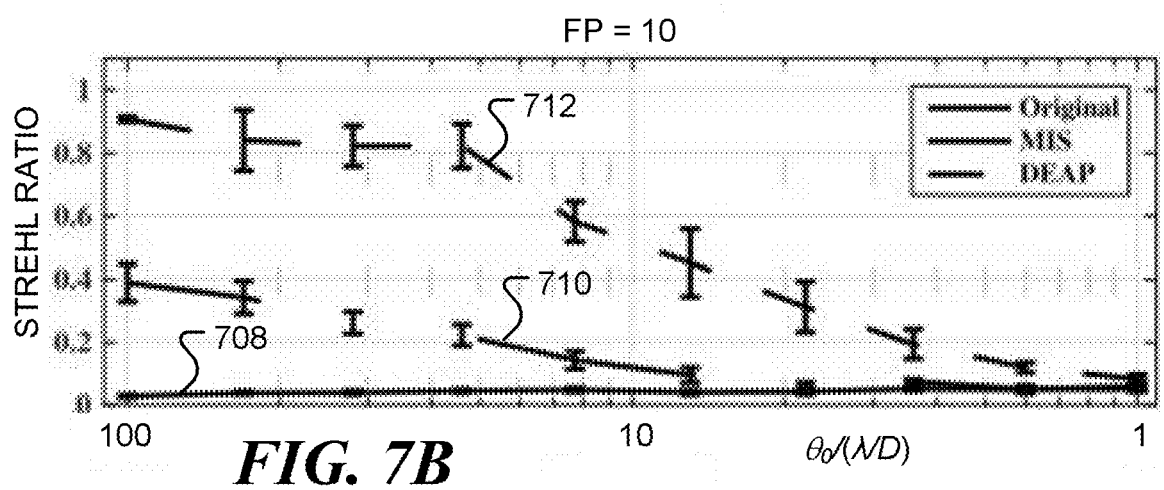
Figure 7C:
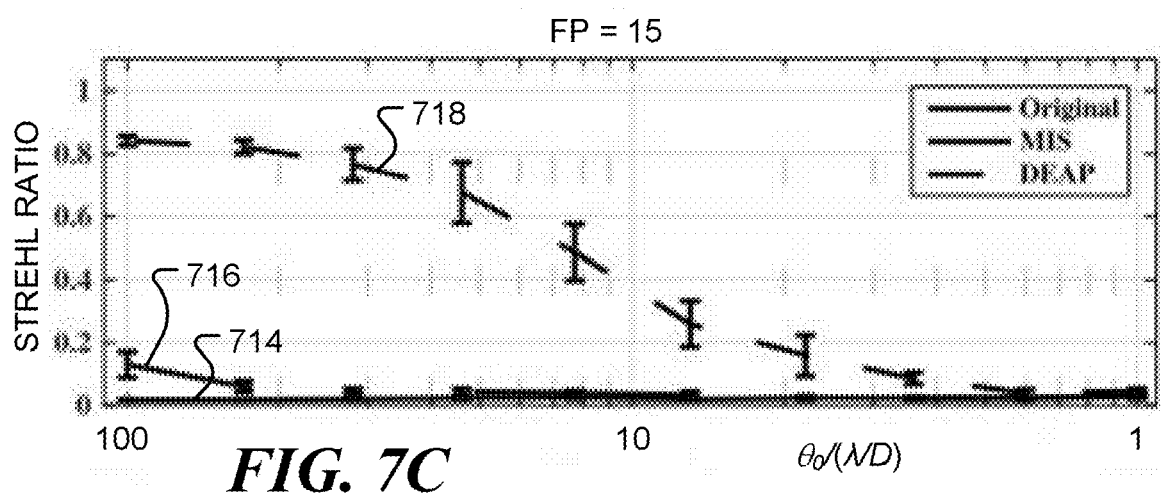

FIGS. 7A-7C shows graphs of a computed Strehl ratio as a function of $\theta_0/(\lambda D)$ for Fried Parameters FP=5, 10, 15, respectively, for simulated data. Again, higher values of FP correspond to stronger turbulence. The Strehl ratio provides an indirect measure of the errors in the reconstructed or estimated phase perturbations and is defined as $$\text{Strehl Ratio} = \frac{\max_i |[A_{\phi_c}^H D(a)]_i|^2}{\max_i |[A_0^H D(a)]_i|^2}, \quad (16)$$

where a is the aperture function, the transfer function $A_{\phi_c}^H$ indicates backpropagation through regions with phases $\phi_c = \phi - \hat{\phi}$ and the transfer function $A_0^H$ indicates backpropagation through a vacuum. Here, $\hat{\phi}$ is a vector of simulated phase perturbations and $\hat{\phi}$ is a vector of the reconstruction or estimated phase perturbations.

FIG. 7A shows that, for FP=5, the Strehl ratio 702 when the estimated phase perturbations are zero is lower than the Strehl ratio 704 for phase perturbations estimated by the MIS receiver or the Strehl ratio 706 for phase perturbations estimated by the disclosed digital hologram receiver.

FIG. 7B shows corresponding results for FP=10. Again, the Strehl ratio 708 when the estimated phase perturbations are zero is lower than the Strehl ratio 710 for phase perturbations estimated by the MIS receiver or the Strehl ratio 712 for phase perturbations estimated by the disclosed digital hologram receiver.

FIG. 7C shows corresponding results for FP=15. Again, the Strehl ratio 708 when the estimated phase perturbations are zero is lower than the Strehl ratio 710 for phase perturbations estimated by the MIS receiver or the Strehl ratio 712 for phase perturbations estimated by the disclosed digital hologram receiver.

The simulation results in FIGS. 5A-5C, 6A-6C and 7A-7C indicate that the disclosed digital hologram receiver provides improved performance over the prior MIS receiver.

Further details and additional example results for a specific embodiment are provided in the attached Appendix titled 'Imaging through Deep Turbulence with Single-Shot Digital Holography using the DEAP Algorithm'.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled, or executed to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A method of optical sensing to estimate and correct phase errors along an optical propagation path, comprising:
   storing in a memory a discrete model of the optical propagation path between an illuminated object and at least one sensor array, wherein
   the illuminated object has complex valued reflection coefficients,
   the discrete model comprises a plurality of planar regions of interest orthogonal to and distributed along the optical propagation path, and
   light propagated through the planar regions is subject to estimated phase error values;
   storing a discrete model of reflectance values in the memory;
   sensing light reflected from the illuminated object at the at least one sensor array;
   determining, from the sensed light, complex data comprising an array of amplitude and phase values;
   creating a test function using the amplitude and the phase values; and
   searching the test function to find the estimated phase error values and estimated reflectance values for which the test function is at an extremum, whereby the estimated reflectance values form a focused image of the object, and are dependent upon the complex valued reflection coefficients, and the estimated phase error values provide a plurality of wavefronts of light as well as properties of the phase errors.

2. The method of optical sensing defined in claim 1, wherein the test function is dependent upon:

a data fidelity term dependent upon the complex data, with the amplitude and the phase values being determined from a single frame of the at least one sensor array;

a first regularization term dependent upon the estimated phase error values, and a second regularization term dependent upon the estimated reflectance values.

3. The method of optical sensing defined in claim 2 wherein the amplitude and phase values are dependent upon the complex valued reflection coefficients of the illuminated object and further dependent upon an actual optical propagation path between the illuminated object and the at least one sensor array.

4. The method of optical sensing defined in claim 3 wherein searching the test function comprises:

searching the planar regions in sequence or simultaneously, to find the estimated phase error values in each of the planar regions for which the test function is at the extremum; and searching the test function to find the estimated reflectance values for which the test function is at the extremum.

5. The method of optical sensing defined in claim 4, wherein searching the test function is performed for a plurality of iterations, and further comprising, at each of the iterations, initializing the estimated phase error values in the respective planar regions to the phase error values found in a previous search of the test function prior to searching the planar regions to find the estimated phase error values in the respective planar regions for which the test function is at the extremum.

6. The method of optical sensing defined in claim 5, further comprising, at each of the iterations, setting the reflectance values to a uniform reflectance value prior to searching the test function to find the reflectance values for which the test function is at the extremum.

7. The method of optical sensing defined in claim 6, further comprising forming the focused image from the estimated reflectance values for which the test function is at the extremum.

8. The method of optical sensing defined in claim 6, further comprising determining the wavefronts of the light reflected from the illuminated object at or in one or more of the planar regions, from the estimated phase error values for which the test function is at the extremum.

9. The method of optical sensing defined in claim 6, further comprising determining the properties of the phase errors in the actual optical propagation path between the illuminated object and the at least one sensor array, from the estimated phase error values for which the test function is at the extremum.

10. The method of optical sensing defined in claim 4, further comprising forming the focused image from the estimated reflectance values for which the test function is at the extremum.

11. The method of optical sensing defined in claim 4, further comprising determining the wavefronts of the light reflected from the illuminated object at or in one or more of the planar regions, from the estimated phase error values for which the test function is at the extremum.

12. The method of optical sensing defined in claim 4, further comprising determining the properties of the phase errors in the actual optical propagation path between the illuminated object and the at least one sensor array, from the estimated phase error values for which the test function is at the extremum.

* * * * *